United States Patent
Evrard

(10) Patent No.: US 7,779,667 B2
(45) Date of Patent: Aug. 24, 2010

(54) DEVICE FOR EXTRACTING AT LEAST ONE GAS CONTAINED IN A DRILLING MUD AND ASSOCIATED ANALYSIS ASSEMBLY

(75) Inventor: Jean-François Evrard, Vieillevigne (FR)

(73) Assignee: Geoservices Equipements, Le Blance Mesnil (FR)

( * ) Notice: Subject to any disclaimer, the term of this patent is extended or adjusted under 35 U.S.C. 154(b) by 413 days.

(21) Appl. No.: 11/664,130

(22) PCT Filed: Sep. 1, 2005

(86) PCT No.: PCT/FR2005/002185

§ 371 (c)(1),
(2), (4) Date: May 7, 2008

(87) PCT Pub. No.: WO2006/035124

PCT Pub. Date: Apr. 6, 2006

(65) Prior Publication Data

US 2009/0199618 A1 Aug. 13, 2009

(30) Foreign Application Priority Data

Sep. 30, 2004 (FR) .................................. 04 10361

(51) Int. Cl.
*G01N 33/24* (2006.01)
*G01N 1/22* (2006.01)
*B01D 19/00* (2006.01)

(52) U.S. Cl. .................... 73/19.09; 73/19.01; 73/19.1; 73/863; 73/864.81

(58) Field of Classification Search ............... 73/19.01, 73/19.09, 19.1, 19.12, 863, 864.81
See application file for complete search history.

(56) References Cited

U.S. PATENT DOCUMENTS

| | | | | |
|---|---|---|---|---|
| 2,214,674 A | * | 9/1940 | Hayward | 73/152.04 |
| 2,263,108 A | * | 11/1941 | Stuart | 250/254 |
| 2,289,687 A | * | 7/1942 | Stuart | 324/324 |
| 3,255,576 A | | 6/1966 | Dawkins et al. | |
| 3,633,687 A | | 1/1972 | West et al. | |
| 3,645,131 A | * | 2/1972 | Turner et al. | 73/152.04 |
| 3,865,736 A | * | 2/1975 | Fries | 508/539 |
| 4,225,314 A | * | 9/1980 | Macourt | 436/26 |
| 4,287,761 A | * | 9/1981 | Moffet et al. | 73/152.19 |

(Continued)

FOREIGN PATENT DOCUMENTS

WO    2004/027208    4/2004

*Primary Examiner*—David A. Rogers
(74) *Attorney, Agent, or Firm*—Wenderoth, Lind & Ponack, L.L.P.

(57) ABSTRACT

The inventive device (53) comprises an enclosure (63), means (65) for supplying the drilling mud into the enclosure (63), and means (67) for discharging the drilling mud from the enclosure (63). The device also comprises means (69) for introducing a carrier gas into the enclosure (63) and a pipe (71), which serves to extract the gas discharging into the enclosure (63) and which is connected to suction means (109). The device (53) additionally comprises selective venting means (72) comprising a vent pipe (115) perforated over the extracting pipe (71) and means (117) for closing the vent pipe (115). These means (117) are designed for opening the vent pipe (115) when the pressure at at least one point (121) of the device is less than a predetermined set value. The invention is used for analyzing the gaseous content of muds from drilling oil wells.

8 Claims, 2 Drawing Sheets

U.S. PATENT DOCUMENTS

Figure 1:
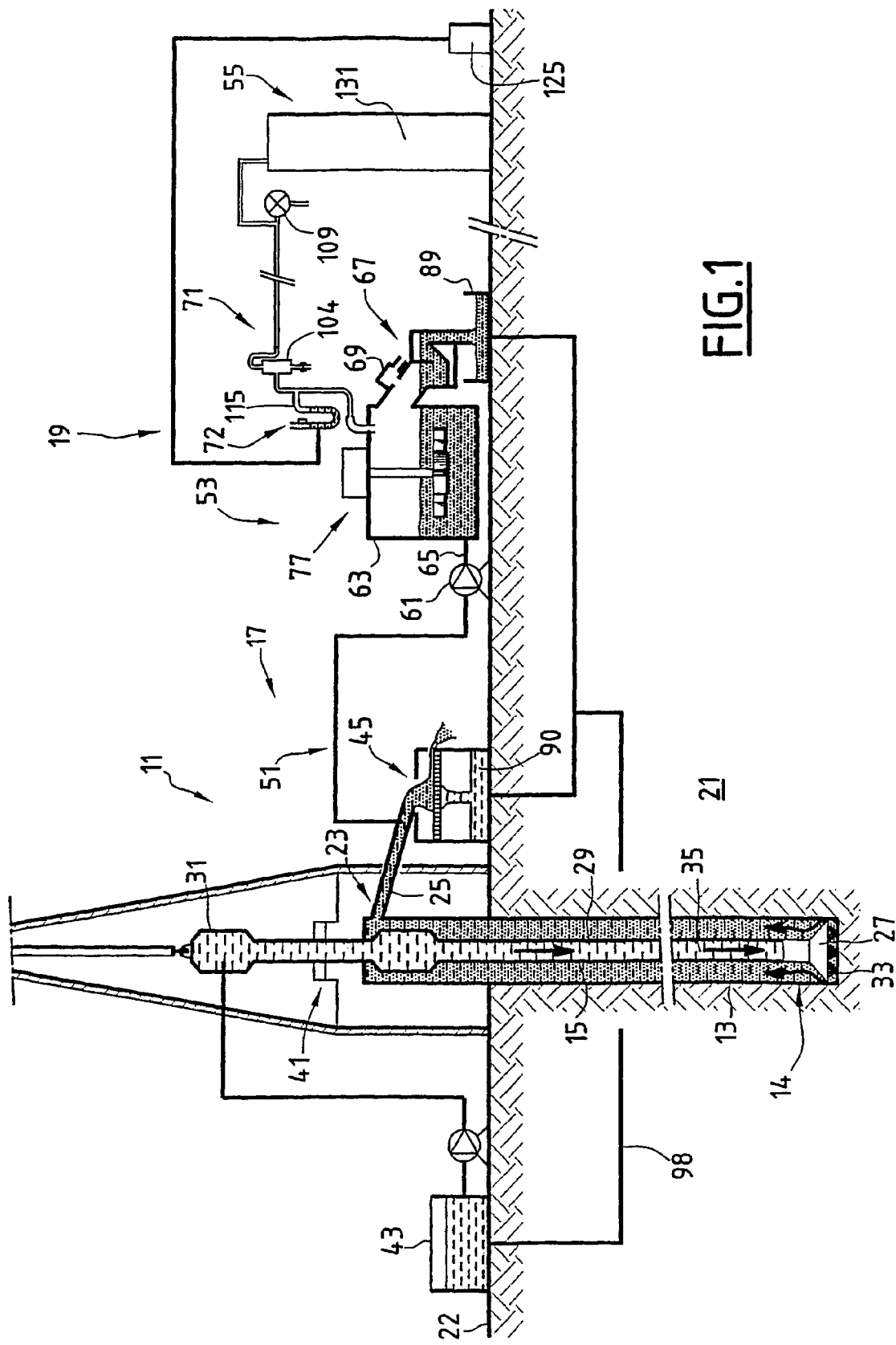

| | | | | |
|---|---|---|---|---|
| 4,635,735 A * | 1/1987 | Crownover | .................. | 175/48 |
| 4,666,471 A | 5/1987 | Cates | | |
| 4,878,382 A * | 11/1989 | Jones et al. | .............. | 73/152.04 |
| 4,887,464 A * | 12/1989 | Tannenbaum et al. | .... | 73/152.04 |
| 4,961,343 A * | 10/1990 | Boone | ..................... | 73/152.03 |
| 5,007,488 A * | 4/1991 | Donovan | ..................... | 175/59 |
| 5,199,509 A * | 4/1993 | Wright et al. | ................. | 175/50 |
| 5,277,263 A * | 1/1994 | Amen | ......................... | 175/42 |
| RE34,975 E * | 6/1995 | Orban et al. | .................. | 367/34 |
| 5,469,917 A * | 11/1995 | Wolcott | ................. | 166/250.01 |
| 5,648,603 A * | 7/1997 | Hanson | ................... | 73/152.02 |
| 6,039,128 A * | 3/2000 | Brunato | ..................... | 175/70 |
| 6,212,948 B1 | 4/2001 | Ekdahl et al. | | |
| 6,389,878 B1 | 5/2002 | Zamfes | | |
| 6,609,433 B2 * | 8/2003 | Taylor et al. | ............. | 73/863.03 |
| 7,032,444 B2 * | 4/2006 | Breviere et al. | .......... | 73/152.23 |
| 7,124,030 B2 * | 10/2006 | Ellis | .............................. | 702/9 |
| 7,174,254 B2 * | 2/2007 | Ellis | .............................. | 702/9 |
| 7,232,548 B2 * | 6/2007 | Duriez et al. | ................. | 422/83 |
| 7,392,138 B2 * | 6/2008 | Frechin et al. | ................. | 702/9 |
| 7,529,626 B1 * | 5/2009 | Ellis | .............................. | 702/9 |
| 7,666,679 B2 * | 2/2010 | Herzhaft et al. | ............... | 436/32 |
| 2003/0019304 A1 * | 1/2003 | Taylor et al. | ............. | 73/863.03 |
| 2004/0203160 A1 * | 10/2004 | Herzhaft et al. | ............... | 436/32 |
| 2005/0256646 A1 * | 11/2005 | Ellis | .............................. | 702/9 |
| 2005/0256647 A1 * | 11/2005 | Ellis | .............................. | 702/9 |
| 2006/0202122 A1 * | 9/2006 | Gunn et al. | ............. | 250/339.13 |
| 2006/0254421 A1 * | 11/2006 | Boone | ........................ | 95/260 |
| 2008/0083273 A1 * | 4/2008 | Sroka et al. | ............. | 73/152.55 |
| 2008/0147326 A1 * | 6/2008 | Ellis | .............................. | 702/9 |
| 2009/0008560 A1 * | 1/2009 | Gunn et al. | ................. | 250/343 |

\* cited by examiner

DEVICE FOR EXTRACTING AT LEAST ONE GAS CONTAINED IN A DRILLING MUD AND ASSOCIATED ANALYSIS ASSEMBLY

The present invention relates to a device for extracting at least one gas contained in a drilling mud, of the type comprising:

an enclosure;
means for supplying the drilling mud to the enclosure;
means for discharging the drilling mud from the enclosure;
means for introducing a carrier gas into the enclosure;
a gas-extraction pipe which opens into the upper portion of the enclosure and which is connected, downstream of the enclosure, to suction means.

When an oil well or other effluent well (especially gas, vapour, water) is drilled, it is known to carry out an analysis of the gaseous compounds contained in the drilling muds emerging from the well. This analysis enables the geological succession of the formations traversed during drilling to be reconstituted and is involved in the determination of the possibilities of working the fluid deposits encountered.

This analysis, which is carried out continuously, comprises two main stages. The first stage consists in extracting the gases conveyed by the mud (for example, hydrocarbon compounds, carbon dioxide, hydrogen sulphide). The second stage consists in qualifying and quantifying the gases extracted.

In the first stage, degassing devices with mechanical agitation of the above-mentioned type (U.S. Pat. No. 4,635,735) are often used. The gases extracted from the mud, which are mixed with the carrier gas introduced into the enclosure, are conveyed by suction via the gas-extraction pipe to an analyzer which enables the extracted gases to be quantified.

Such devices are not entirely satisfactory because the extraction of the gases requires vigorous agitation of the mud in the enclosure. Under the effect of this agitation, mud residues are thrown against the walls of the enclosure and in some cases they block the pipe via which the carrier gas is introduced into the enclosure.

Under the effect of suction by the extraction pipe, the pressure in the enclosure decreases. Below a critical value, the mud is sucked into the extraction pipe and conveyed through that pipe.

The analysis of the gases then has to be interrupted in order to replace the extraction pipe and to clean the analysis means if they have been polluted.

The main object of the invention is therefore to increase the reliability of the extraction and analysis of the gases contained in a drilling m ud.

To that end, the invention relates to a device of the above-mentioned type, characterized in that it also comprises means for selective venting comprising:

a vent pipe tapped into the extraction pipe;
means for closing the vent pipe, which are suitable for opening said vent pipe when the pressure at at least one predetermined point in the device is lower than a predetermined set value.

The device according to the invention may comprise one or more of the following features, taken in isolation or according to any technically possible combination:

the closing means are suitable for opening the vent pipe in an autonomous manner;
the predetermined point is located on the vent pipe, between the closing means and the extraction pipe;
the closing means comprise a liquid;
the vent pipe comprises a siphon-forming portion, the said liquid being located in the siphon-forming portion when the pressure at the predetermined point is greater than the set value;
the internal volume of the siphon-forming portion is less than 10% of the internal volume of the enclosure; and
the means for introducing a carrier gas into the enclosure comprise an intake for air at atmospheric pressure, the difference between the set value and the atmospheric pressure being less than 50 mbar.

The invention relates also to an assembly for analyzing at least one gas contained in a drilling mud, of the type comprising:

means for sampling mud;
an extraction device such as defined above, the sampling means opening into the means for supplying the mud;
means for analyzing the gas, which are connected to the extraction pipe.

Figure 2:
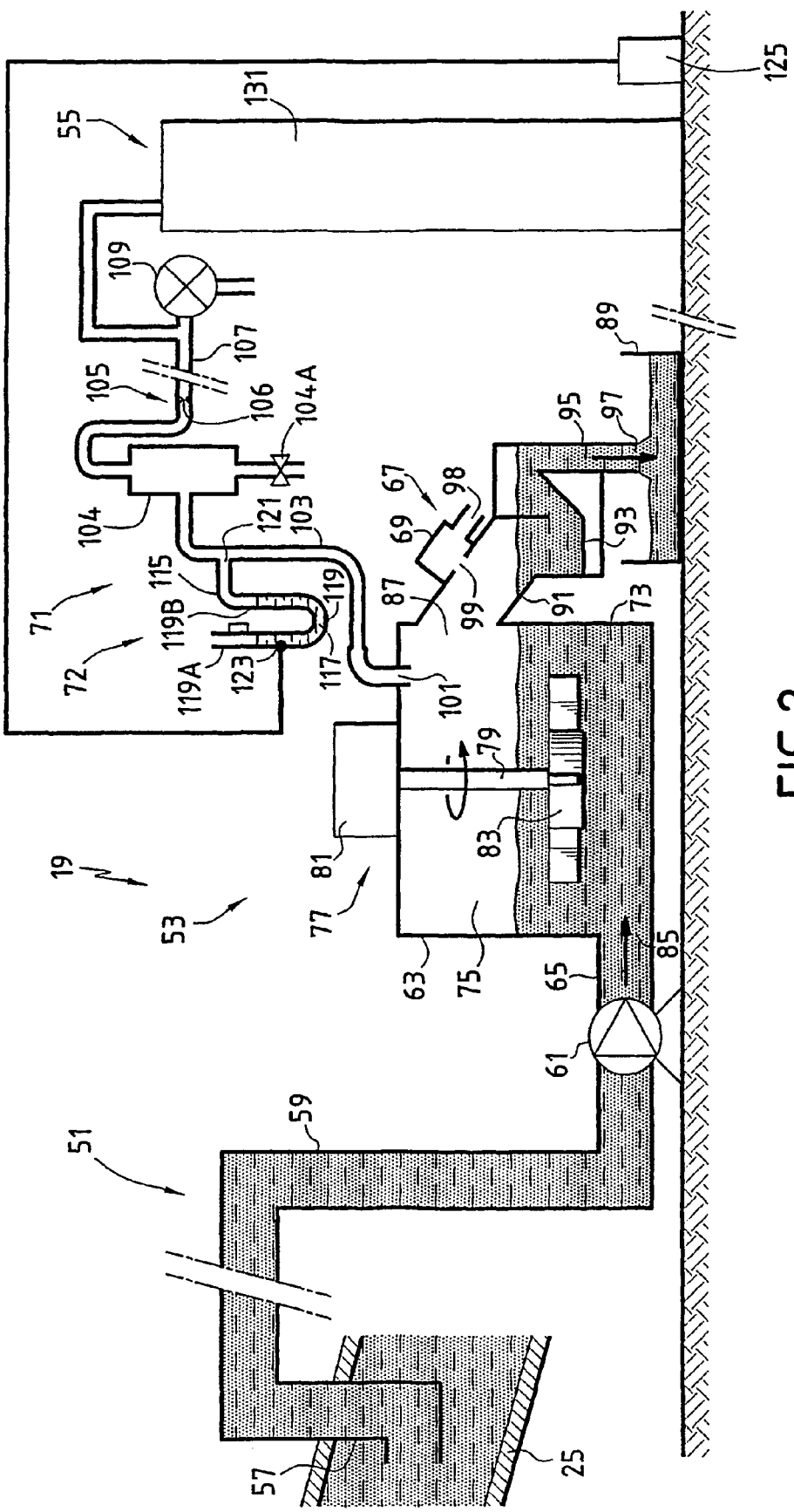

An embodiment of the invention will now be described with reference to the appended drawings in which:

FIG. 1 is a diagrammatic view in vertical section of a drilling installation provided with an analysis assembly according to the invention; and FIG. 2 is a diagrammatic view in vertical section of the main elements of the analysis assembly according to the invention.

Throughout the following, the terms "upstream" and "downstream" are to be understood in relation to the direction of flow of a fluid in a pipe.

An analysis assembly according to the invention is used, for example, in an installation for drilling an oil production well.

As illustrated in FIG. 1, the installation 11 comprises a drilling duct 13 in a cavity 14 bored by a rotary drilling tool 15, a surface installation 17, and an analysis assembly 19 according to the invention.

The drilling duct 13 is located in the cavity 14 bored in the sub-soil 21 by the rotary drilling tool 15. The duct 13 comprises, at the surface 22, a well head 23 provided with a draining pipe 25.

The drilling tool 15 comprises a drilling head 27, a drilling fitting 29, and a head 31 for the injection of liquid.

The drilling head 27 comprises means 33 for boring through the rocks of the sub-soil 21. The drilling head 27 is mounted on the lower portion of the drilling fitting 29 and is positioned at the bottom of the drilling duct 13.

The fitting 29 comprises a set of hollow drilling tubes. These tubes delimit an internal space 35 which enables a liquid to be supplied from the surface 22 to the drilling head 27. For that purpose, the head 31 for injecting liquid is screwed onto the upper portion of the fitting 29.

The surface installation 17 comprises means 41 for supporting and rotatably driving the drilling tool 15, means 43 for injecting the drilling liquid, and a vibrating screen 45.

The injection means 43 are connected hydraulically to the injection head 31 in order to introduce a liquid and to cause it to flow in the internal space 35 of the drilling fitting 29.

The vibrating screen 45 collects the liquid which is charged with drilling residues and which is discharged from the draining pipe 25, and separates the liquid from the solid drilling residues.

As illustrated in FIG. 2, the analysis assembly 19 comprises mud-sampling means 51 which are tapped into the draining pipe 25, a gas-extraction device 53, and means 55 for analyzing the extracted gases. In a variant, the sampling means 51 are tapped into a liquid-receiving tank into which the draining pipe 25 opens.

The sampling means 51 comprise a liquid-sampling head 57 located in a projecting manner in the draining pipe 25, a connecting tube 59, and a peristaltic pump 61, the flow rate of which is adjustable.

The extraction device 53 comprises an enclosure 63, a pipe 65 for supplying mud to the enclosure 63, a pipe 67 for discharging the mud from the enclosure 63, means 69 for introducing a carrier gas into the enclosure 63, a pipe 71 for extracting the extracted gases from the enclosure 63 and means 72 for selective venting.

The enclosure 63 comprises a sealed container, the internal volume of which is, for example, from 0.04 litre to 0.3 litre or from 0.3 litre to 3 litres. The enclosure 63 comprises a lower portion 73 in which the mud circulates and an upper portion 75 which has a gaseous cover. The enclosure 63 is also provided with agitating means 77 comprising an agitator 79 mounted in a projecting manner in the enclosure 63 and rotatably driven by a motor 81 mounted on the upper portion 75 of the enclosure 63. The agitator 79 comprises an agitating moving body 83 immersed in the mud.

The pipe 65 for supplying mud extends between the outlet of the peristaltic pump 61 and an inlet opening 85 provided in the lower portion 73 of the enclosure 63.

This supply pipe 65 may be provided with means (not shown) for heating the mud in order to bring the temperature of the mud to values of from 25 to 120° C., preferably from 60 to 90° C.

The discharge pipe 67 extends between an overflow passage 87 provided in the upper portion 75 of the enclosure 63, and a retaining vat 89 which is to receive the muds discharged from the device 53.

In a variant, the retaining vat 89 is formed by the tank 90 for receiving the liquids extracted from the vibrating screen 45.

The discharge pipe 67 comprises, in succession, a downwardly inclined upstream portion 91, which forms an angle of approximately 45° with the horizontal, a siphon-forming bent portion 93, and a substantially vertical downstream portion 95 which is open at its lower end 97 facing the vat 89, above the level of the liquid contained in the vat 89.

The mud introduced into the enclosure 63 via the supply pipe 65 is discharged by overflowing into the discharge pipe 67 through the overflow passage 87. In addition, some of the mud discharged dwells temporarily in the siphon 93 of the discharge pipe 67, which prevents gas from entering the upper portion 75 of the enclosure 63 by way of the lower end 97 of the discharge pipe 67. The introduction of gas into the enclosure 63 is therefore effected purely by the means 69 for introducing carrier gas.

The mud collected in the retaining vat 89 and in the tank 90 is recycled to the injection means 43 by way of a pipe 98 for recirculating mud.

The means 69 for introducing a carrier gas into the enclosure comprise an air intake 98 mounted on the upstream portion 91 of the discharge pipe 67. This air intake 98 opens into an injection passage 99 in the discharge pipe.

In the example illustrated, the carrier gas is constituted by the air surrounding the installation, at atmospheric pressure, so that the pressure in the enclosure 63 is kept substantially constant at the atmospheric pressure when the injection passage 99 is open.

The extraction pipe 71 extends between an extraction opening 101 provided in the upper portion 75 of the enclosure, and the analysis means 55. It comprises, from upstream to downstream, an upstream portion 103, a liquid-recovery vessel 104, a volume flow rate controller 105, a transport line 107 and suction means 109.

The recovery vessel 104 has a receiving opening into which the upstream portion 103 opens, and, in its upper portion, a discharge opening connected to the controller 105.

In a variant, a filtration stage is interposed between the vessel 104 and the controller 105.

The vessel 104 is provided, at its base, with a draining pipe 104A equipped with a valve.

The flow rate controller 105 is formed by a tube having a necked portion 106 having a calibrated cross-section.

The transport line 107 connects the enclosure 63, located in the vicinity of the well head 23, in an explosive region, to the analysis means 55 located at a distance from the well head 23, in a non-explosive region, for example, in a pressurized cabin.

The transport line 107 can be manufactured from a polymeric material, especially polyethylene, and has, for example, a length ranging from 10 m to 500 m.

The suction means 109 comprise a vacuum pump which permits the conveyance by suction of the gases extracted from the enclosure 63 to the analysis means 55.

The means 72 for selective venting comprise a vent pipe 115, and means 117 for closing the vent pipe 115.

The vent pipe 115 is tapped into the upstream portion 103 of the extraction pipe 71, between the recovery vessel 104 and the extraction opening 101.

It comprises a siphon-forming portion 119 which has two parallel columns 119A and 119B which are connected to each other by their lower ends.

The column 119B on the right in FIG. 2 is connected to the extraction pipe 71 by a substantially horizontal pipe segment. The column 119A on the left in FIG. 2 is connected to a vent, which may be the gas surrounding the installation 19, or a reservoir of neutral gas.

The closing means 117 comprise a liquid located in the siphon-forming portion 119 of the vent pipe 115.

The liquid located in the columns 119A and 119B is constituted by a cleaning liquid, for example water, or else by a liquid of low volatility, for example, an oil. More generally, this liquid does not generate gaseous compounds capable of interfering with the compounds to be quantified by the analysis means 55, especially $C_1$ to $C_8$ hydrocarbons and aromatic compounds, such as benzene, toluene and xylene.

The level of liquid in the columns 119A and 119B is selected in such a manner that, when the pressure at the tapping point 121 between the vent pipe 115 and the extraction pipe 71 is lower than a predetermined set value, the liquid in the vent pipe 115 is subjected to suction and flows into the extraction pipe 71.

The difference between the set value and atmospheric pressure is from 0 mbar to 50 mbar, especially from 10 mbar to 40 mbar.

Moreover, the internal volume of the columns 119A and 119B is selected in such a manner that the volume of liquid necessary to close the vent pipe 115 is less than 10% of the internal volume of the enclosure 63. The volume of liquid is also lower than the volume of the liquid-recovery vessel 104.

The left-hand column 119A is provided with a sensor 123 for detecting liquid in the column 119A, which sensor is connected electrically to means 125 for controlling the assembly 19. When the sensor 123 detects the absence of liquid in the column 119A, it generates an alarm signal which is transmitted to the control means 125. The analysis means 55 comprise instrumentation 131 which enables one or more extracted gases to be detected and quantified.

The instrumentation 131 comprises, for example, apparatus for infrared detection for quantifying the carbon dioxide, FID (flame ionization detector) chromatographs for detecting hydrocarbons, or also TCD (thermal conductivity detector)

chromatographs, depending on the gases to be analyzed. It also comprises a gas chromatography system connected to a mass spectrometer, this system having the abbreviation GC-MS. The detection and simultaneous quantification of a plurality of gases is therefore possible.

The means 131 are connected to a tap on the line 107, which tap is located upstream of the vacuum pump 109 and in the vicinity of that pump 109.

The operation of the analysis assembly 19 according to the invention, during the drilling of a well, will now be described by way of example with reference to FIG. 1.

In order to carry out a drilling operation, the drilling tool 15 is rotatably driven by the surface installation 41. A drilling liquid is introduced into the internal space 35 of the drilling fitting 29 by the injection means 43. This liquid descends to the drilling head 27 and passes into the drilling duct 13 through the drilling head 27. The liquid cools and lubricates the boring means 33. The liquid then collects the solid debris resulting from the drilling operation and goes back up via the annular space defined between the drilling fitting 29 and the walls of the drilling duct 13, and is then discharged by way of the draining pipe 25.

Referring to FIG. 2, the peristaltic pump 61 is then activated in order to sample continuously a predetermined fraction of the drilling mud flowing in the pipe 25.

This mud fraction is conveyed to the enclosure 63 via the supply pipe 65.

The agitator 79 is rotatably driven by the motor 81 and agitates the mud in the lower portion 73 of the enclosure 63 in order to bring about the extraction of the gases contained in that mud, and also the mixing of the extracted gases with the carrier gas sucked in via the injection passage 99.

The gas mixture is extracted via the extraction pipe 71, under the effect of the suction produced by the vacuum pump 89. The mixture is conveyed to the analysis means 55 where it is qualified and quantified by the instrumentation 131.

When mud residues thrown onto the walls of the enclosure 63 and of the discharge pipe 67 block the injection passage 99, the suction of the gas mixture from the enclosure 63 by the vacuum pump 109 is not compensated for by introducing carrier gas into the enclosure 63. Consequently, the pressure in the enclosure 63 and in the extraction pipe 71 decreases.

When the pressure in the extraction pipe 71 decreases below the set value, in particular at the tapping point 121, the liquid contained in the venting pipe 115 is sucked into the extraction pipe 71.

When all of this liquid has passed into the extraction pipe 71, the vent pipe 115 is opened. The liquid is collected in the recovery vessel 104. The extraction pipe 71 is connected to the vent, and the value of the pressure in the upstream portion 103 of the pipe 71, then in the enclosure 63 goes back up to atmospheric pressure almost immediately.

Therefore, only the liquid initially contained in the vent pipe 115 is sucked into the extraction pipe 71. Consequently, the clogging of this pipe 71 and/or of the analysis means 55 by the drilling mud is prevented.

The closing means 117 are suitable for opening the vent pipe 115 independently when the pressure at the point 121 is lower than the set value.

The detection sensor 123 then detects the absence of liquid in the left-hand column 119A and transmits an alarm signal to the alarm means 125.

The injection passage 99 is then cleaned by an operator or by an automated cleaning device, and then a predetermined amount of liquid is introduced into the vent pipe 115 in order to close it.

The analysis assembly 19 is brought back into service very rapidly, without it being necessary to clean or even replace the extraction pipe 71, the vacuum pump 109, and/or the instrumentation 131 of the analysis means 55.

In a variant, the closing means 117 comprise a breakable flap or a valve controlled by pressure.

In this last-mentioned case, the opening of the valve can be brought about when the pressure at a point in the upstream portion 103 is lower than the predetermined set value.

Owing to the extraction device 53 according to the invention, it is possible to have available a particularly reliable assembly for extracting and analyzing the gases contained in a drilling mud.

This device 53 prevents, by simple and inexpensive means, the clogging of the extraction pipe 71 by drilling mud, which increases the productivity and safety of the drilling operation.

The invention claim is:

1. Device for extracting at least one gas contained in a drilling mud, of the type comprising:
    an enclosure;
    means for supplying the drilling mud to the enclosure;
    means for discharging the drilling mud from the enclosure;
    means for introducing a carrier gas into the enclosure;
    a gas-extraction pipe which opens into the upper portion of the enclosure and which is connected, downstream of the enclosure, to suction means;
characterized in that it also comprises means for selective venting comprising:
    a vent pipe tapped into the extraction pipe;
    means for closing the vent pipe, which are suitable for opening said vent pipe when the pressure at at least one predetermined point in the device is lower than a predetermined set value.

2. Device according to claim 1, characterized in that the closing means are suitable for opening the vent pipe in an autonomous manner.

3. Device according to claim 1, characterized in that the predetermined point is located on the vent pipe, between the closing means and the extraction pipe.

4. Device according to, claim 1 characterized in that the means for introducing a carrier gas into the enclosure comprise an intake for air at atmospheric pressure, the difference between the set value and the atmospheric pressure being less than 50 mbar.

5. Device according to claim 1, characterized in that the closing means comprise a liquid.

6. Device according to claim 5, characterized in that the vent pipe comprises a siphon-forming portion, the said liquid being located in the siphon-forming portion when the pressure at the predetermined point is greater than the set value.

7. Device according to claim 5, characterized in that the internal volume of the siphon-forming portion is less than 10% of the internal volume of the enclosure.

8. Assembly for analyzing at least one gas contained in a drilling mud, characterized in that it comprises:
    means for sampling drilling mud;
    a device according to any one of the preceding claims, the sampling means
    opening into the means for supplying the mud;
    means for analyzing the gas, which are connected to the extraction pipe.

* * * * *